United States Patent
Zhang et al.

(10) Patent No.: US 11,262,728 B2
(45) Date of Patent: Mar. 1, 2022

(54) ADDRESS IDENTIFICATION METHOD, APPARATUS AND SYSTEM, AND STORAGE MEDIUM, PROCESSOR AND TERMINAL

(71) Applicant: Siemens Ltd., China, Beijing (CN)

(72) Inventors: Liang Zhang, Beijing (CN); Wei Sun, Wuxi (CN); Yang Wang, Suzhou (CN); Li Hong Hu, Wuxi (CN)

(73) Assignee: SIEMENS LTD., CHINA, Beijing (CN)

( * ) Notice: Subject to any disclaimer, the term of this patent is extended or adjusted under 35 U.S.C. 154(b) by 0 days.

(21) Appl. No.: 17/268,491

(22) PCT Filed: Aug. 17, 2018

(86) PCT No.: PCT/CN2018/101091
§ 371 (c)(1),
(2) Date: Feb. 15, 2021

(87) PCT Pub. No.: WO2020/034197
PCT Pub. Date: Feb. 20, 2020

(65) Prior Publication Data
US 2021/0240161 A1   Aug. 5, 2021

(51) Int. Cl.
*G05B 19/4093* (2006.01)
*G06F 16/23* (2019.01)

(52) U.S. Cl.
CPC ... *G05B 19/40937* (2013.01); *G06F 16/2379* (2019.01)

(58) Field of Classification Search
None
See application file for complete search history.

(56) References Cited

U.S. PATENT DOCUMENTS 6,112,262 A * 8/2000 Goettsch ............. G06F 13/4226
710/29
8,489,408 B2 * 7/2013 Sawanaga ............. G06Q 10/06
705/2

FOREIGN PATENT DOCUMENTS

| CN | 103309827 A | 9/2013 |
| CN | 108228785 A | 6/2018 |
| DE | 102007035159 A1 | 1/2009 |

OTHER PUBLICATIONS

International Search Report PCT/ISA/210 and Written Opinion of the International Searching Authority PCT/ISA/237 for International Application No. PCT/CN2018/101091 dated Aug. 17, 2018.

(Continued)

*Primary Examiner* — Umut Onat
(74) *Attorney, Agent, or Firm* — Harness, Dickey & Pierce, P.L.C.

(57) ABSTRACT

An address identification method, apparatus, system, storage medium, a processor and a terminal are disclosed. In an embodiment, the method includes: defining a screening library including at least one expected attribute value describing an expected state value of a device parameter to be addressed in an operating mode of an industrial device; acquiring a data group including an actual state value generated in the operating mode and an address where the actual state value is stored; for each address, extracting an actual attribute value, stored in the address, of the actual state value; comparing the actual attribute value with the expected attribute value, determining the actual state value corresponding to the actual attribute value which complies with the expected attribute value, and determining, from the data group, an address corresponding to the selected actual state value; and taking the selected address as a final address and outputting same.

20 Claims, 7 Drawing Sheets

(56) References Cited

OTHER PUBLICATIONS

International Search Report and Written Opinion and English translation thereof dated May 17, 2019.

* cited by examiner

ADDRESS IDENTIFICATION METHOD, APPARATUS AND SYSTEM, AND STORAGE MEDIUM, PROCESSOR AND TERMINAL

PRIORITY STATEMENT

This application is the national phase under 35 U.S.C. § 371 of PCT International Application No. PCT/CN2018/101091 which has an International filing date of Aug. 17, 2018, which designated the United States of America, the entire contents of which are hereby incorporated herein by reference.

FIELD

Embodiments of the present invention generally relate to the data analysis field of industrial devices. In particular, embodiments of the present invention relate to a method, apparatus and system for identifying the address of device parameters of an industrial device, and a storage medium, processor and terminal.

BACKGROUND ART

The importance of Internet of things (IoT) platforms (for example, MINDSPHERE, a cloud based open Internet of things operating system of SIEMENS, or other industrial cloud platforms) in asset management or device monitoring is ever increasing. However, these IoT platforms still face many problems in specific applications. For example, machine tools are a very important and expensive asset in factories. The analysis of data of machine tools is of great importance and factories also require the data of machine tools to obtain related information. In the imaginable future, factories will gradually be rebuilt into digital factories. Currently, digital factories cannot be realized, however. This is because the technical processes of device manufacturers and the aging degrees and types of devices are different and the technical protocols are not open. These causes will make it difficult to access and analyze data during the acquisition of related data.

Nowadays, measures have been taken to acquire data. For example, data is acquired through a computer numerical control (CNC) system, an external sensor or a programmable logic controller (PLC). A large amount of data can directly be acquired from a CNC system. However, the technologies and data ports of a CNC system are confidentially protected, so data cannot be acquired easily. Of course, a large amount of data can also be acquired when an external sensor is connected to a machine tool. However, this acquisition mode may face problems in data analysis or system stability because of the connection of the sensor.

Compared with a CNC system and an external sensor, a PLC is easier and more practical to acquire data because of the openness of the port. With a PLC it is very easy to integrate some libraries to acquire data. For example, the object linking and embedding (OLE) for process control (OPC)-unified architecture (UA) is an open multi-platform protocol and data can easily be acquired through the integration of the OPC-UA into a PLC. In addition, a PLC can also be applied to different industrial devices provided by different manufacturers (for example, FANUC™ and MITSUBISHI™) because of the openness of the port.

However, even if various data of industrial devices has been acquired, the problem about how to associate raw data with the status of industrial devices still exists. For example, how to acquire useful device parameter information such as working status, feed and program number from raw data is a problem. Although manufacturers may provide some factory settings of the controllers of industrial devices, the storage address of most device parameters in the controller is still unknown. Especially, after the program in the controller, for example, PLC or CNC, of industrial devices is modified in the factory of the user, the original factory settings are destroyed, and thus it is very difficult to obtain the association between the device parameters and the storage address.

SUMMARY

Experienced engineers will usually observe and identify the association between the device parameters and the storage address in the controller according to their experience. However, the inventors have discovered that such an artificial observation is obviously time-consuming and labor-consuming, and the association can be identified only based on the experience of engineers.

Accordingly, embodiments of the present invention provides a method, apparatus and system for identifying the address of device parameters of industrial devices, and a medium, processor and terminal to improve upon or even solve the problem that it is difficult to quickly find device parameters in a large amount of industrial device data in the data analysis field of traditional industrial devices. The address identification method provided by at least one embodiment of the present invention is especially suitable for the situation where cloud platforms (for example, MINDSPHERE, a cloud based open Internet of things operating system of SIEMENS) are applied because it is basically independent of human experience. Since a cloud platform is usually connected with a plurality of industrial devices and acquires a large amount of industrial data, the address identification method according to the at least one embodiment of present invention realizes quick addressing in the situation where a cloud platform is applied and therefore is very favorable.

According to one embodiment of the present invention, a method for identifying the address of device parameters of an industrial device is provided. The method comprises:

defining a screening library, wherein the screening library comprises at least one expected attribute value and the expected attribute value describes an expected status value of device parameters to be addressed in at least one preset operating mode of an industrial device, acquiring a data array, wherein the data array comprises an actual status value generated in the preset operating mode of the industrial device and an address where the actual status value is stored in a controller controlling the industrial device, for each address, extracting the actual attribute value of the actual status value stored in the address, comparing the actual attribute value with the expected attribute value, determining the corresponding actual status value of the actual attribute value complying with the expected attribute value, and determining the corresponding address of the actual status value selected from the data array, and outputting the selected addresses as final addresses.

According to another embodiment of the present invention, an apparatus for identifying the address of device parameters of an industrial device is provided. The apparatus comprises:

a definition unit, configured to define a screening library, wherein the screening library comprises at least one expected attribute value and the expected attribute value describes an expected status value of device parameters to be addressed in at least one preset operating mode of an industrial device, an acquisition unit, configured to acquire a data array, wherein the data array comprises an actual status value generated in the preset operating mode of the industrial device and an address where the actual status value is stored in a controller controlling the industrial device, an extraction unit, configured to extract for each address the actual attribute value of the actual status value stored in the address, a screening unit, configured to compare the actual attribute value with the expected attribute value, determine the corresponding actual status value of the actual attribute value complying with the expected attribute value, and determine the corresponding address of the actual status value selected from the data array, and an output unit, configured to output the selected addresses as final addresses.

According to another embodiment of the present invention, a system for identifying the address of device parameters of an industrial device is provided. The system comprises industrial devices and a cloud platform, and the cloud platform has an embodiment of the apparatus for identifying the address of device parameters of an industrial device. A communication connection is established between the industrial devices and the cloud platform over a network. In one illustrative embodiment of the present invention, a communication connection is established between industrial devices and the apparatus over the Internet.

According to a further embodiment of the present application, a storage medium is provided and the storage medium contains a stored program, wherein the program controls the execution of the method according to an embodiment of the present invention by the device where the storage medium is located when the program is run.

According to another embodiment of the present application, a processor is provided and the processor is used to run a program, wherein the program executes the method according to an embodiment of the present invention when the program is run.

According to yet another embodiment of the present application, a terminal is provided and the terminal comprises one or more processors, a memory and one or more programs, wherein one or more programs are stored in the memory and are configured to be executed by one or more processors, and one or more programs execute the method according to an embodiment of the present invention.

According to a still further embodiment, a computer program product is further provided, the computer program product is tangibly stored in a computer-readable medium and comprises computer-executable instructions, and when the computer-executable instructions are executed, at least one processor executes the method according to an embodiment of the present invention.

BRIEF DESCRIPTION OF THE DRAWINGS

The drawings described here are used to provide a better understanding of the present invention and constitute a part of the present invention. The illustrative embodiments and the descriptions of the present invention are used to explain the present invention, but do not constitute an improper limitation of the present invention. In the drawings.

DESCRIPTION OF REFERENCE NUMERALS

Figure 1:
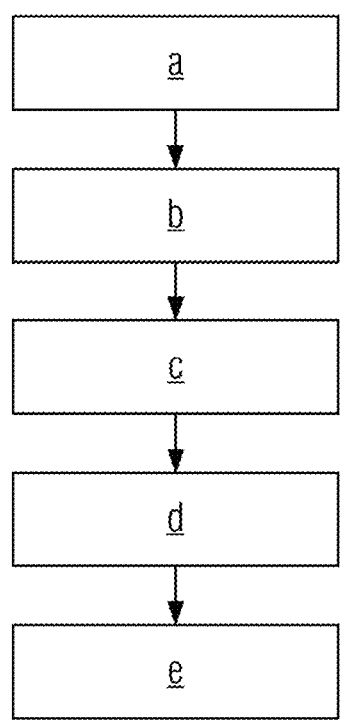
FIG. 1 is a flowchart of the method for identifying the address of device parameters of an industrial device according to the embodiments of the present invention.

100: Apparatus for identifying the address of device parameters of an industrial device
101: Definition unit
101A: Receiving module
102: Acquisition module
102A: Communication module
103: Extraction unit
104: Screening unit
105: Output unit
105A: Mapping module
105B: Display module
106: Determination unit
107: Resetting unit
200: Cloud platform
201: Reader
202: Collector
203: Database
300: Industrial device
400: Controller
500: Input/output device

DETAILED DESCRIPTION OF THE EXAMPLE EMBODIMENTS

According to one embodiment of the present invention, a method for identifying the address of device parameters of an industrial device is provided. The method comprises:

a) defining a screening library, wherein the screening library comprises at least one expected attribute value and the expected attribute value describes an expected status value of device parameters to be addressed in at least one preset operating mode of an industrial device, b) acquiring a data array, wherein the data array comprises an actual status value generated in the preset operating mode of the industrial device and an address where the actual status value is stored in a controller controlling the industrial device, c) for each address, extracting the actual attribute value of the actual status value stored in the address, d) comparing the actual attribute value with the expected attribute value, determining the corresponding actual status value of the actual attribute value complying with the expected attribute value, and determining the corresponding address of the actual status value selected from the data array, and e) outputting the selected addresses as final addresses.

In this way, an automatic association between the storage address in the controller and device parameters is realized by presetting expected attribute values for device parameters and screening a large number of actual status values acquired by industrial devices according to the expected attribute values. Thus, the present invention simplifies the identification of the storage address of device parameters, avoids a process of observations and evaluations by humans, saves time and obviously improves the accuracy of associations.

Here, a preset operating mode is different from the normal operating mode of an industrial device and is a special operating mode preset for the industrial device when the method according to at least one embodiment of the present invention is run. Since the preset operating mode cannot be realized by the internal controller of the industrial device in this case, it can be manually completed by field operators or realized by an external controller attached to the industrial device. In the preset operating mode, the device parameters to be addressed will have preset expected attribute values or performances. In other words, the expected attribute values of the device parameters to be addressed correspond to the preset operating mode. By selecting the actual status values having the expected attribute values from a large number of acquired actual status values, the actual values of the device parameters to be addressed in the preset operating mode and the corresponding storage address are found.

According to an example embodiment of the present invention, between step d) and step e), the method further comprises the following steps:

f) determining whether the number of the selected addresses complies with the expected number preset at the time of defining the screening library, and g) if no, iteratively performing step a) to step d), wherein the screening library is redefined and the data array is reacquired for each iteration.

In this way, more accurate screening is realized. The "iteration" here should be interpreted as executing the method according to the present invention again on the basis of the result of a previous screening. It can be thought that when step a) to step d) are performed, although a special preset operating mode is used, subject to the restriction of the screening conditions, namely, expected attribute values, a plurality of actual status values may have the same actual attribute value. This will confuse the storage address, and thus the screening result is inaccurate. Therefore, when the number of the selected addresses is greater than the expected number, the previous screening result needs to be screened again. In this case, the screening library and the preset operating mode should be replaced and the data array in the new operating mode should be acquired again, however. Then, actual status values and other data stored in the previously selected address should be selected from the newly acquired data array before screening.

According to the example embodiments of the present invention, an expected attribute value is selected from an array consisting of a plurality of attribute values. The array comprises a plurality of preset attribute values, and then a screening library can easily be established by selecting a combination of a plurality of attribute values.

According to the example embodiments of the present invention, the expected attribute value is a manually input parameter and may be a numerical value, an array, a Boolean value, or a character string, for example.

In this way, the especially flexible setting of a screening library is realized. For example, the screening library comprises the combination of manually input parameters and preset attribute values. Accordingly, the screening library better matches the statuses of device parameters in a preset operating mode.

According to the example embodiments of the present invention, the actual attribute value of an actual status value is extracted with the aid of a function related to an expected attribute value. In this way, the actual attribute value and the expected attribute value describe the same attribute. For example, when the expected attribute value describes the data type of the expected status value, the data type of the actual status value is obtained with the aid of the data type determination function, and the data type of the actual status value is used as the actual attribute value. When the expected attribute value is, for example, a manually input numerical value or Boolean value, the actual status value complying with the numerical value or Boolean value is acquired by invoking the numerical value matching function and is used as the actual attribute value.

According to the example embodiments of the present invention, the acquired data array is a time sequence data array. That is to say, the data array not only comprises the actual status value and the address where the actual status value is stored in the controller, but also comprises the corresponding storage time data. Thus, the actual status values stored in each address form a time sequence array.

In this way, the analysis of the change trend of the actual status values is very simply realized. In this case, the change curve of actual status values over time is used as actual attribute values of actual status values. In this sense, an actual attribute value represents the monotonicity, periodicity and mean value of an actual status value.

According to the example embodiments of the present invention, a mapping is established between the final addresses and the device parameters to be addressed, and the established mapping is transmitted to a database so that the mapping can be invoked later.

In this way, the association between device parameters and the storage address in the controller is stored in the database. Thus, the stored association can still be invoked if necessary when the method according to the present invention is run or industrial devices are operated later, without any necessity of performing a screening again.

According to another embodiment of the present invention, an apparatus for identifying the address of device parameters of an industrial device is provided. The apparatus comprises:

a definition unit, configured to define a screening library, wherein the screening library comprises at least one expected attribute value and the expected attribute value describes an expected status value of device parameters to be addressed in at least one preset operating mode of an industrial device, an acquisition unit, configured to acquire a data array, wherein the data array comprises an actual status value generated in the preset operating mode of the industrial device and an address where the actual status value is stored in a controller controlling the industrial device, an extraction unit, configured to extract for each address the actual attribute value of the actual status value stored in the address, a screening unit, configured to compare the actual attribute value with the expected attribute value, determine the corresponding actual status value of the actual attribute value complying with the expected attribute value, and determine the corresponding address of the actual status value selected from the data array, and an output unit, configured to output the selected addresses as final addresses.

In this way, an automatic association between the storage address in the controller and device parameters is realized by presetting expected attribute values for device parameters and screening a large number of actual status values acquired by industrial devices according to the expected attribute values.

According to the example embodiments of the present invention, the apparatus further comprises:

a determination unit, configured to determine whether the number of the selected addresses complies with the expected number preset at the time of defining the screening library, and a resetting unit, configured to reset the screening library defined by the definition unit and the data array acquired by the acquisition unit if no so that the definition unit can redefine the screening library and the acquisition unit can reacquire the data array.

In this way, an iterative operation of the apparatus is realized. In each iterative operation, the data array is screened again on the basis of the result of the previous operation. After the acquired data array is screened one or more times, an accurate screening result is obtained and the reliability of screening is improved.

According to the example embodiments of the present invention, the acquisition unit of the apparatus comprises a communication module and the communication module receives the data array. Here, the communication module is connected with the controller controlling an industrial device or the communication module of the industrial device over the Internet. Such an application scenario is realized especially in the form of a cloud platform to help the construction of digital factories and IoT.

According to the example embodiments of the present invention, the definition unit of the apparatus comprises a receiving module and the receiving module receives a manually input parameter as an expected attribute value. An array consisting of a plurality of attribute values is further stored in the definition unit.

In this way, the especially flexible setting of a screening library is realized. For example, the screening library comprises the combination of manually input parameters and preset attribute values. Accordingly, the screening library better matches the statuses of device parameters in a preset operating mode.

According to the example embodiments of the present invention, the output unit further comprises a mapping module, the mapping module establishes a mapping between the determined storage address and the device parameters to be addressed, and the established mapping is transmitted to a database so that the mapping can be invoked later.

In this way, the association between device parameters and the storage address in the controller is stored in the database. Thus, the stored association can still be invoked if necessary when the method according to the present invention is run or industrial devices are operated later, without any necessity of performing a screening again.

According to the example embodiments of the present invention, the output unit further comprises a display module and the display module displays the final addresses. In this way, the finalized storage address is directly displayed for the operator. Of course, the display module also displays the selected address for the operator in an iterative operation, and thus, the operator can conveniently determine whether the number of the selected addresses complies with the expected number and whether the data array needs to be screened again. In addition, the display module further displays the screening library and the array stored in the definition module and consisting of a plurality of attribute values.

According to another embodiment of the present invention, a system for identifying the address of device parameters of an industrial device is provided. The system comprises industrial devices and a cloud platform, and the cloud platform has an embodiment of the apparatus for identifying the address of device parameters of an industrial device. A communication connection is established between the industrial devices and the cloud platform over a network. In one illustrative embodiment of the present invention, a communication connection is established between industrial devices and the apparatus over the Internet.

In one illustrative embodiment of the present invention, the controller controlling industrial devices is deployed on the cloud platform and remotely controls the industrial devices over a communication connection. Here, a communication connection is established between a plurality of industrial devices and the cloud platform, and thus remote control over different industrial devices in different factories is realized through one controller on the cloud platform.

According to a further embodiment of the present application, a storage medium is provided and the storage medium contains a stored program, wherein the program controls the execution of the method according to an embodiment of the present invention by the device where the storage medium is located when the program is run.

According to a fourth embodiment of the present application, a processor is provided and the processor is used to run a program, wherein the program executes the method according to an embodiment of the present invention when the program is run.

According to a fifth embodiment of the present application, a terminal is provided and the terminal comprises one or more processors, a memory and one or more programs, wherein one or more programs are stored in the memory and are configured to be executed by one or more processors, and one or more programs execute the method according to an embodiment of the present invention.

According to a sixth embodiment, a computer program product is further provided, the computer program product is tangibly stored in a computer-readable medium and comprises computer-executable instructions, and when the computer-executable instructions are executed, at least one processor executes the method according to an embodiment of the present invention.

To let those skilled in the art better understand the technical solutions of the present invention, the following will clearly and completely describe the technical solutions in the embodiments of the present invention in combination with the drawings in the embodiments of the present invention. Obviously, the embodiments described are only a part, and not all of the embodiments of the present invention. All other embodiments obtained by those skilled in the art on the basis of the embodiments of the present invention without any creative work should fall within the scope of protection of the present invention.

It should be noted that the terms "first" and "second" in the description, claims and the drawings are used to distinguish between similar objects, but not necessarily used to describe a specific order or sequence. It should be understood that the data used in such a way can be interchanged in a proper case so that the described embodiments of the present invention can be implemented in an order other than shown or described here. In addition, the terms "comprise" and "have" and their variants are intended to cover non-exclusive inclusions. For example, the process or method comprising a series of steps or the system, product or device comprising a series of modules or units are not necessarily limited to those clearly-listed steps or modules or units, but may comprise other steps or modules or units which are not clearly listed or are intrinsic to the process, method, product or device.

FIG. 1 is a flowchart of the method for identifying the address of device parameters of an industrial device according to the embodiments of the present invention. The method comprises the following steps:

a) Define a screening library, wherein the screening library comprises at least one expected attribute value and the expected attribute value describes an expected status value of device parameters to be addressed in at least one preset operating mode of an industrial device. Below, the possible cases of expected attribute values are described in combination with the schematic diagram of attribute values shown in FIG. 2.

Numerical value type: In this case, expected attribute values are Boolean values, character strings, integers or floating-point numbers.

Numerical value: In this case, expected attribute values are numerical values of expected status values to be found. For example, when a constant needs to be found, a fixed value can be manually input, and when an array needs to be found, the array can be manually input.

Figure 2:
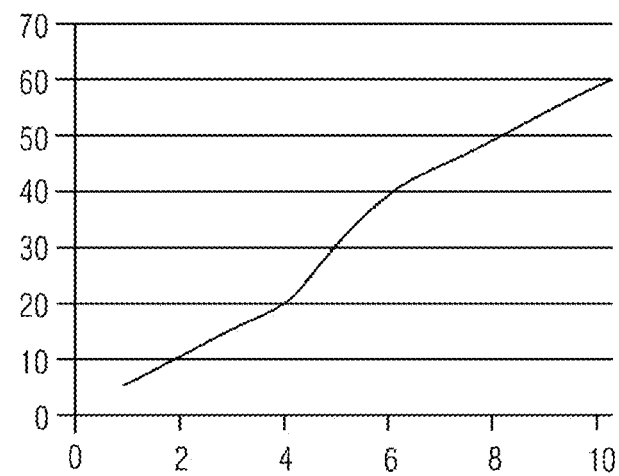
FIG. 2 is a schematic diagram of attribute values according to the embodiments of the present invention.
Figure 2:
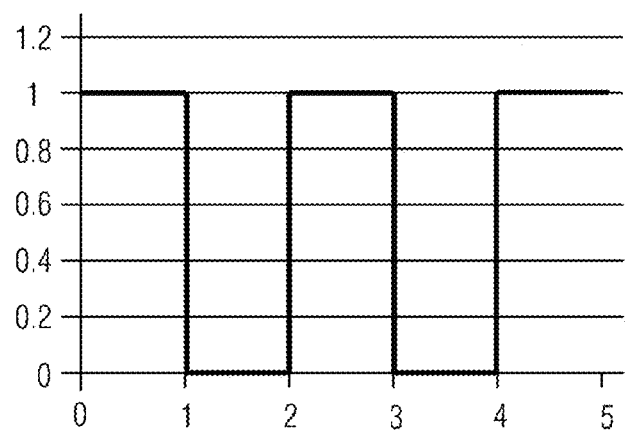
Figure 2:
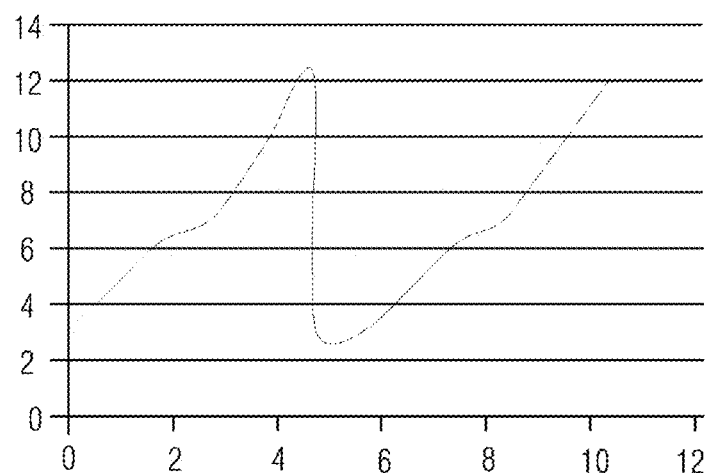

Change trend: In this case, expected attribute values represent the change curve of expected status values over time. For example, expected attribute values "monotonically increase", "monotonically decrease", "periodically repeat", or "have a reset change". When expected attribute values periodically repeat, the period needs to be input according to the requirement so that data can be screened more accurately. A reset change means that the change trend of values over time is either an increasing change or a decreasing change, but the values regress to the origin between two consistent changes. FIG. 2 shows possible change curves. The upper curve in FIG. 2 is a "monotonically increasing" change curve of expected attribute values. The middle curve in FIG. 2 is a "periodically repeating" change curve of expected attribute values. The lower curve in FIG. 2 is a change curve having a reset change of expected attribute values.

Feature: In this case, expected attribute values describe other features of expected status values, for example, mean value, maximum value, minimum value and symbol.

Period: In this case, expected attribute values are the earliest storage time and the latest storage time of expected status values, and the earliest storage time and the latest storage time are, for example, equal to the start time and the end time of a preset operating mode, respectively. With the aid of time selection, the time segments to be screened can purposefully be selected. For example, after a plurality of preset operating modes are completed, a corresponding time segment to be screened each time can be determined by selecting the time segment.

In an illustrative embodiment of the present invention, besides expected attribute values, the screening library should further comprise a preset number of selected addresses.

The screening library is shown, for example, in the form of the following table, for the operator. Here, a screening library is established for five device parameters (working status, feed, indicator lamp, current and program change) to be addressed, respectively, and they describe different expected status values, respectively.

TABLE 1

| Status example | Status value type | Change trend | Feature | Period |
|---|---|---|---|---|
| Working status | Boolean value | Constant (true/false) | Positive value | Complete period |
| Feed | Integer | Monotonically increasing/decreasing | Positive value | Complete period |
| Indicator lamp | Boolean value | Periodically repeating (1 s) | Positive value | Complete period |
| Current | Floating point | Mean value | Absolute value | Complete period |
| Program No. | Character string | Constant ("cnc20180423") | | Complete period |

The first row in Table 1 describes the names of expected attribute values and the names represent the aspects of the expected status values to be described by the expected attribute values. The first column describes the device parameters to be addressed.

In one illustrative embodiment of the present invention, Table 1 exists in the form of an application (APP) program and the expected attribute values are selected from a plurality of attribute values in the dropdown column of the table.

b) Acquire a data array, wherein the data array comprises an actual status value generated in the preset operating mode of the industrial device and an address where the actual status value is stored in a controller controlling the industrial device.

For example, the data array is acquired in the form of Table 2.

TABLE 2

| Time | Address | Value |
|---|---|---|
| 2008.01.03 12:00:01 | Q1.0 | 34 |
| 2008.01.03 12:00:03 | Q1.0 | 37 |
| . . . | | . . . |
| 2008.01.03 12:00:01 | DB31DBB0 | 12 |
| 2008.01.03 12:00:02 | DB31DBB0 | 13 |
| . . . | . . . | . . . |

Table 2 shows an arranged time sequence data array. Of course, data acquired from the PLC may not be arranged in order. In this case, data is organized according to the addresses, and the data each address corresponds to is sorted according to the storage time.

c) For each address, extract the actual attribute value of the actual status value stored in the address. In Table 2, actual status values are already sorted by address and time. In this case, the actual attribute value of the actual status value stored in each address is extracted with the aid of the function associated with each attribute value in Table 1.

For example, the working status in Table 1 has an expected attribute value: Boolean value, the data type determination function is invoked according to the expected attribute value, and the data type determination function is applied to the corresponding actual status values 34 and 37 in address Q1.0 to determine their data types. Then, the data type determination function is also applied to the corresponding actual status values 12 and 13 in address DB31DBB0.

In one illustrative embodiment, the extraction of actual attribute values has nothing to do with the expected attribute values in the screening library. Instead, the actual attribute values are extracted according to the preset attribute values. Here, the preset attribute values should contain the description of all aspects of actual status values.

d) Compare the actual attribute values with the expected attribute values, determine the corresponding actual status values of the actual attribute values complying with the expected attribute values, and determine the corresponding address of the actual status values selected from the data array.

For example, after the data type of the corresponding actual status value in address Q1.0 in Table 2 is acquired in step c), the acquired data type is compared with the Boolean value in Table 1, and the comparison result is recorded. Then, for the corresponding actual status values in address Q1.0 in Table 2, such a comparison is performed according to each expected attribute value in Table 1. When the actual status values in the address satisfy all expected values of the working status, the address is recorded as the selected address. Finally, such a comparison method is performed for each address in Table 2.

e) Output the selected addresses as final addresses.

Figure 3:
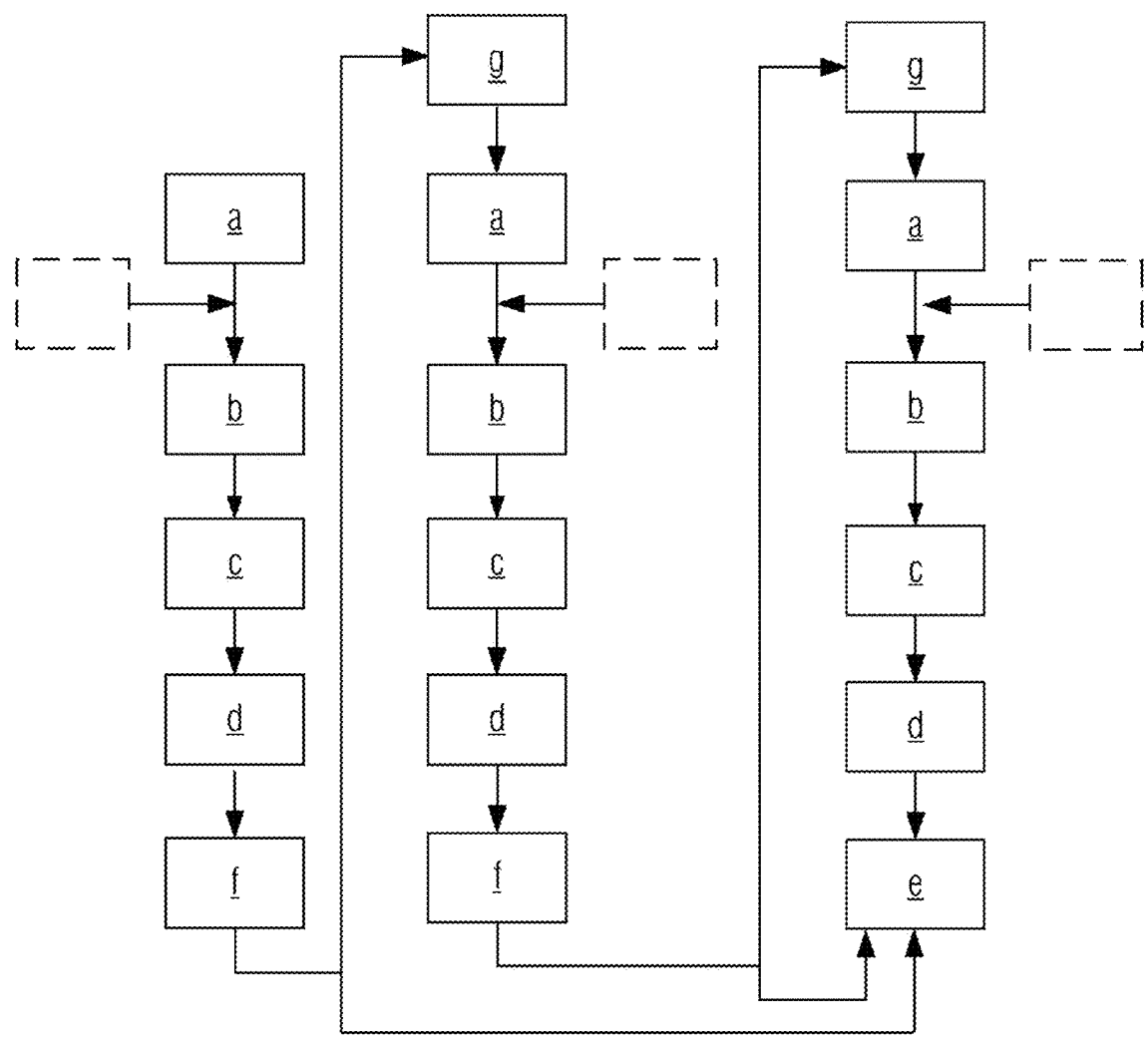
FIG. 3 is a flowchart of the method for identifying the address of device parameters of an industrial device according to a first illustrative embodiment of the present invention.

FIG. 3 is a flowchart of the method for identifying the address of device parameters of an industrial device according to a first illustrative embodiment of the present invention. Here, the address identification method according to the first illustrative embodiment of the present invention is executed by an APP product in the form of a Smart filter.

Starting from the left in FIG. 3, the steps of the address identification method according to the present application are performed in turn. In step a), a first screening library: (integer, numerate (5, 10, 20 . . . )) is created. The screening library means that the data type of the expected status value of the device parameters to be addressed is integer and the expected status value is an array (5, 10, 20 . . . ). After step a), the operation by the field operator is shown in the dashed-line box. At this time, the field operator adjusts the feed rate of the industrial device to (5, 10, 20 . . . ), respectively according to the screening library. Of course, the adjustment is not necessarily completed manually. The corresponding adjustment can be completed by an external controller. In step b), various actual status values produced after the adjustment and the address where the actual status values are stored in the controller are acquired from the communication module of the industrial device or the controller controlling (PLC here) the industrial device. Then, step c) and step d) of the method according to the present invention are performed. After screening is completed in step d), the selected addresses (DB1.DBB1, DB21.DBB3, DB21.DBB34 . . . ) are obtained.

In one illustrative embodiment of the present invention, after screening is completed in step d), the selected addresses are output and the operator determines whether the number of selected addresses complies with the expected number. In another illustrative embodiment of the present invention, the selected addresses are not shown to the operator, and instead, the number of the selected addresses is compared with the preset number of addresses to determine whether the two numbers are the same in step f).

When the number of selected addresses does not comply with the expected number of the operator or is inconsistent with the preset number of addresses, step a) to step d) are iteratively performed. Here, if the selected addresses are output for the operator, a prompt for a second screening should be output simultaneously so that the practical requirement of the operator can be better matched.

An iteration should be performed on the basis of the previous screening result. Before each iteration, the screening library and data array before the previous iteration are reset in step g). Thus, a new screening library is created. At this time, for example, a second screening library: (integer, monotone increasing) is created. The second screening library means that the data type of the expected status value of the device parameters to be addressed is integer and the change curve of the expected status value over time monotonically increases.

A new preset operating mode is created according to the new second screening library. At this time, the dashed-line box shows that the field operator gradually increases the feed rate from 0 to 120 according to the second screening library. Then, various actual status values produced after the adjustment and the address where the actual status values are stored in the controller are acquired from the communication module of the industrial device or the controller (PLC here) controlling the industrial device. The field operator clicks Start Matching. Here, some addresses have been selected from the previous screening. Step c) and d) are performed only for the previously selected addresses. After screening is completed in step d), the selected addresses (DB1.DBB1, DB21.DBB3) are obtained.

If the number of the selected addresses after step d) still does not comply with the expected number of the operator or the preset number of addresses, the method according to the present invention is performed iteratively on the basis of the selected addresses from the second screening. Here, a third screening library: (integer, monotone decreasing) is created. The third screening library means that the data type of the expected status value of the device parameters to be addressed is integer and the change trend of the expected status value over time is monotonic decreasing.

The dashed-line box shows that the field operator adjusts the feed rate from 120 to 0 step by step according to the third screening library. After new actual status values and the storage address are acquired from the industrial device or controller, step c) and step d) are performed again for the addresses selected from the second screening. The preset number of addresses (DB21.DBB3) are obtained this time. These addresses are output as final addresses. Later, a mapping is established between the two selected addresses and the device parameter "feed". In one illustrative embodiment of the present invention, the mapping is uploaded to the database so that the mapping can be invoked later when necessary.

Figure 4:
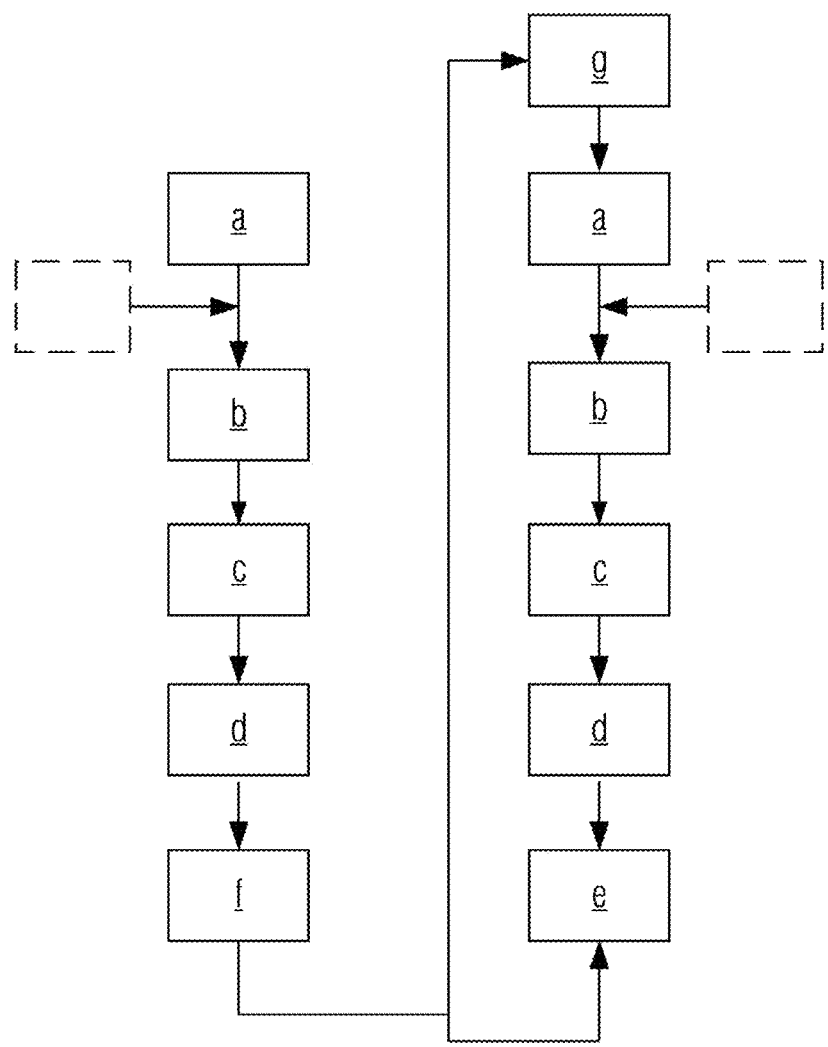
FIG. 4 is a flowchart of the method for identifying the address of device parameters of an industrial device according to a second illustrative embodiment of the present invention.

FIG. 4 is a flowchart of the method for identifying the address of device parameters of an industrial device according to a second illustrative embodiment of the present invention. The flow is roughly the same as the flow in FIG. 3. The difference is that the device parameter to be addressed is the working status of the machine tool. The working status of the machine tool provides information about the availability of the machine tool. For example, the working status of the machine tool can be represented by the status of a yellow indicator lamp. When the machine tool works, the yellow indicator lamp is off. When the machine tool pauses, the yellow indicator lamp flashes. The corresponding screening libraries of these cases are listed in Table 3.

| Status of machine tool | Yellow indicator lamp | Change mode |
| --- | --- | --- |
| Working | Off | (Boolean, constant: false) |
| Pausing during process flow | Flash | (value status, periodical: 1 s) |

When the machine tool works, the expected status value of the working status should be Boolean constant: false. When the machine tool pauses during the process flow, the expected status value of the working status should be a Boolean value repeating every second.

In FIG. 4, a first screening library: (Boolean, constant: false) is set according to the expected status value of the device parameter to be addressed. This means that the attribute of the expected status value should be Boolean constant: false. At this time, the dashed-line box shows that the field operator leaves the machine tool in the working status according to the first screening library.

After the actual status values and the storage address are acquired from the industrial device or the controller controlling the industrial device, step c) and d) of the method according to the present invention are performed. When the number of selected addresses does not comply with the expected number of the operator or is inconsistent with the preset number of addresses, step a) to step d) are iteratively performed. After screening is completed in step d), the selected addresses (DB31.DBB4, DB31.DBB43 . . . ) are obtained.

In FIG. 4, like the first embodiment shown in FIG. 3, a second screening library: (Boolean, periodical: 1s) is created when an iteration is performed. The dashed-line box shows that the field operator periodically pauses the machine tool during the execution of the process flow. After new actual status values and the storage address are acquired from the industrial device or controller, step c) and step d) are performed again for the addresses selected from the previous screening.

The number of the addresses (DB31.DBB43 . . . ) selected this time is consistent with the preset number. Therefore, the addresses selected this time are output as final addresses. In addition, a mapping is established between the two selected addresses (DB31, DBB43) and the device parameter "working status". In one illustrative embodiment of the present invention, the mapping is uploaded to the database so that the mapping can be invoked later when necessary.

Figure 5:
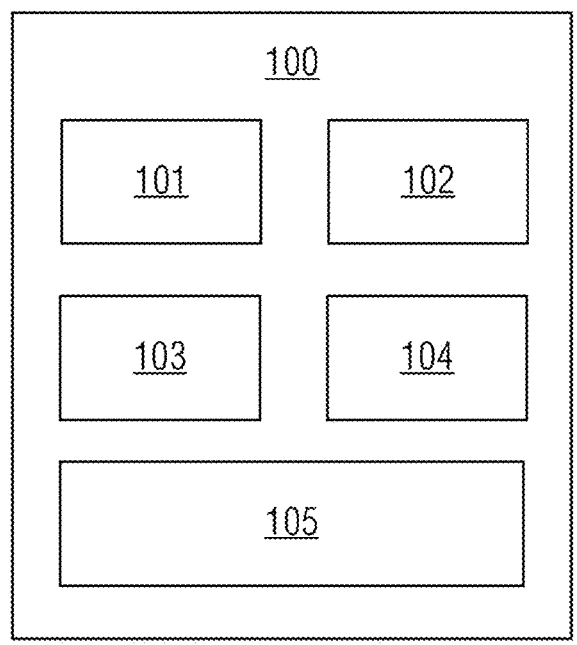
FIG. 5 is a block diagram of the apparatus for identifying the address of device parameters of an industrial device according to the embodiments of the present invention.

FIG. 5 is a block diagram of the apparatus for identifying the address of device parameters of an industrial device according to the embodiments of the present invention. The address identification apparatus 100 comprises a definition unit 101, an acquisition unit 102, an extraction unit 103, a screening unit 104 and an output unit 105.

The definition unit 101 defines a screening library, wherein the screening library comprises at least one expected attribute value and the expected attribute value describes an expected status value of device parameters to be addressed in at least one preset operating mode of an industrial device.

The acquisition unit 102 acquires a data array, wherein the data array comprises an actual status value generated in the preset operating mode of the industrial device and an address where the actual status value is stored in a controller controlling the industrial device.

The extraction unit 103 extracts for each address the actual attribute value of the actual status value stored in the address.

The screening unit 104 compares the actual attribute value with the expected attribute value, determines the corresponding actual status value of the actual attribute value complying with the expected attribute value, and determines the corresponding address of the actual status value selected from the data array.

The output unit 105 outputs the selected addresses as final addresses.

Here, a communication connection is established between the industrial devices and the address identification apparatus over a network. In one example embodiment of the present invention, a communication connection is established between industrial devices and the address identification apparatus over the Internet. In this sense, the address identification apparatus is connected with a plurality of different industrial devices. Industrial devices realize such a connection through the public output port of the industrial devices or the port of the PLC.

Figure 6:
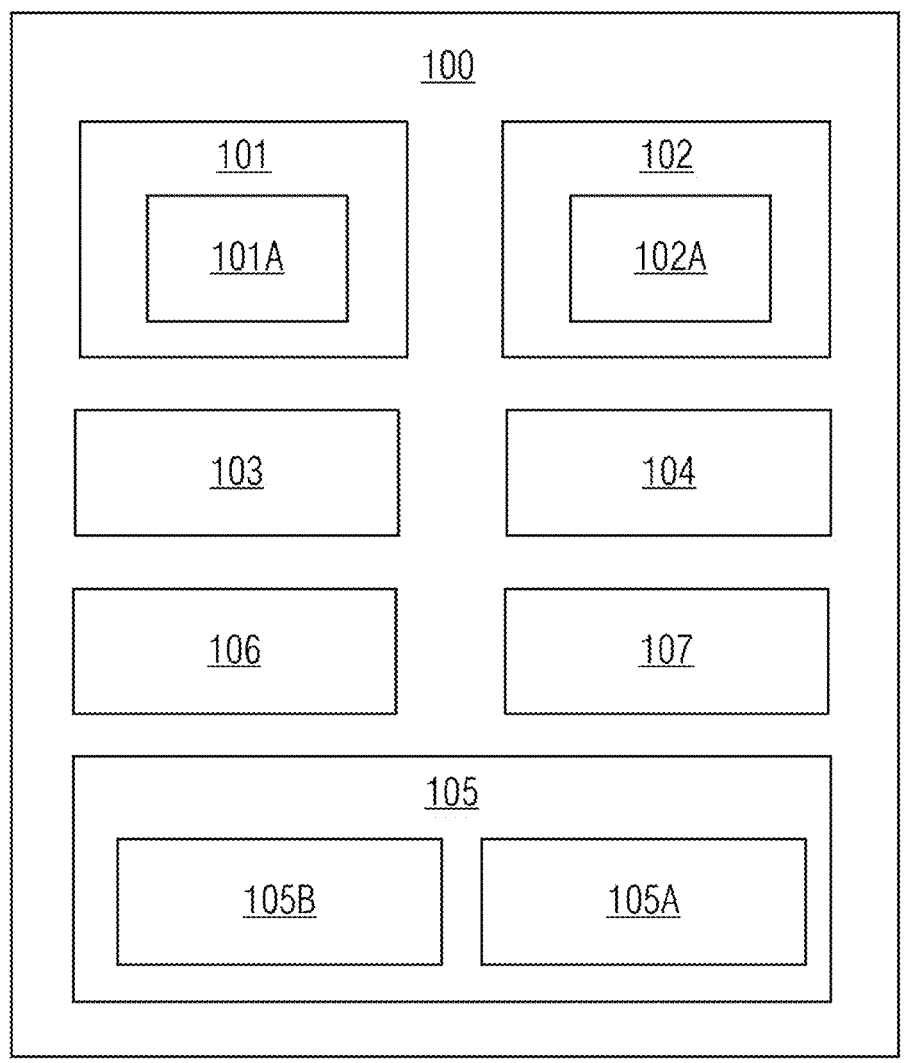
FIG. 6 is a block diagram of the apparatus for identifying the address of device parameters of an industrial device according to the first illustrative embodiment of the present invention.

FIG. 6 is a block diagram of the apparatus for identifying the address of device parameters of an industrial device according to the first embodiment of the present invention.

The differences of the address identification apparatus 100 shown in FIG. 6 from the address identification apparatus shown in FIG. 5 are that the address identification apparatus 100 further comprises a determination unit 106 and a resetting unit 107, the acquisition unit 102 comprises a communication module 102A, the definition unit 101 comprises a receiving module 101A, and the output unit 105 comprises a mapping module 105A and a display module 105B.

The determination unit 106 determines whether the number of the selected addresses complies with the expected number preset at the time of defining the screening library.

The resetting unit 107 resets the screening library defined by the definition unit and the data array acquired by the acquisition unit if no so that the definition unit can redefine the screening library and the acquisition unit can reacquire the data array.

The receiving module 101A receives manually input parameters as expected attribute values.

The communication module 102A receives a data array from industrial devices. Here, the communication module is connected with the controller controlling an industrial device or the communication module of the industrial device over the Internet.

The mapping module 105A establishes a mapping between the determined storage address and the device parameters to be addressed and transmits the established mapping to a database so that the mapping can be invoked later.

The display module 105B display the final addresses. In addition, the display module further displays the screening library and the array stored in the definition module and consisting of a plurality of attribute values. In one illustrative embodiment of the present invention, the display module further displays the addresses selected from each screening and the prompt about a further screening to help the operator to make a determination.

Figure 7:
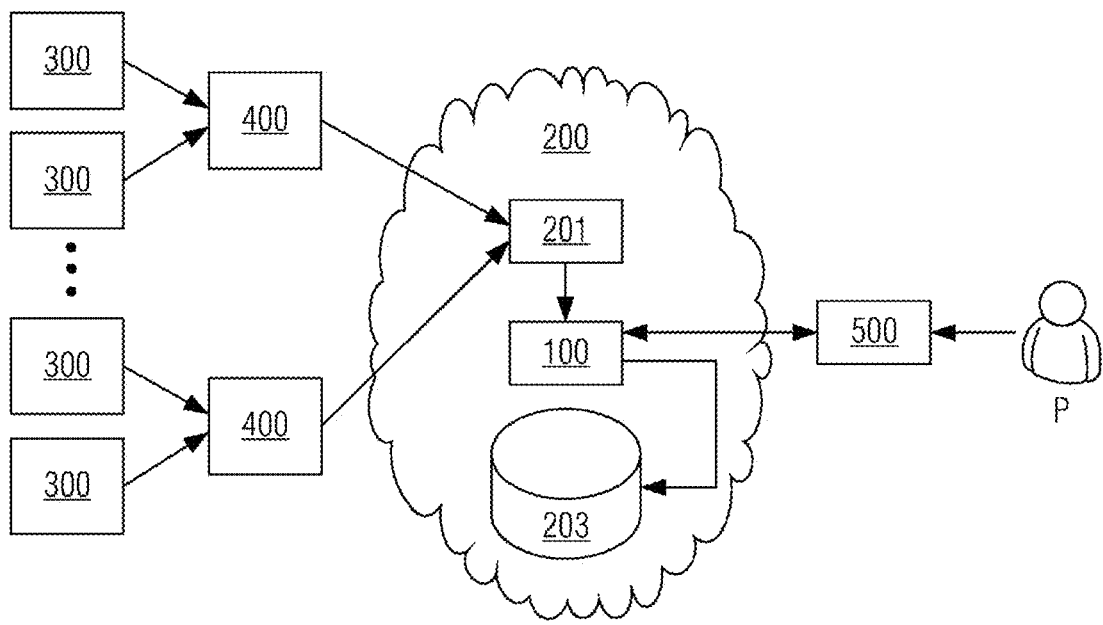
FIG. 7 is a schematic diagram of the system for identifying the address of device parameters of an industrial device according to the embodiments of the present invention.

FIG. 7 shows the system for identifying the address of device parameters of an industrial device according to the embodiments of the present invention. The system comprises a cloud platform 200 and industrial devices 300, wherein the cloud platform has the above-mentioned apparatus 100 for identifying the address of device parameters of an industrial device.

Here, the cloud platform is, for example, a MIND-SPHERE platform or other cloud platforms having similar functions. Generally, the cloud platform establishes a communication connection with a plurality of industrial devices to form a distributed system. Here, industrial devices have a plurality of configuration forms, and are configured into, for example, machine tools, conveyor belts, rolling mills and rotary motors. Physical controllers 400, for example, PLCs, are equipped on the side of the industrial devices.

In this case, the address identification apparatus 100 exists in the form of software service provided by the cloud platform in the cloud platform. The operator remotely invokes the address identification apparatus in the form of software service on the input/output device 500 connected with the cloud platform and performs related operations. The remote invocation is realized in the form of a webpage, for example. In this case, the input/output device is a display, tablet computer or mobile phone on the client side. Here, the input/output device, for example, receives the values to be input from the client and displays the selected addresses to the client.

In the illustrative embodiment shown in FIG. 7, the cloud platform performs reading operations for the internal controller (for example, PLC or other common controllers) of industrial devices. Thus, when the operator remotely invokes the address identification apparatus, the address identification apparatus acquires the data array in the internal controller of industrial devices through the reader 201 of the cloud platform and executes the method shown in FIGS. 1 to 4. In this case, the data array comprises actual status values and the address where the actual status values are stored in the internal controller.

Figure 8:
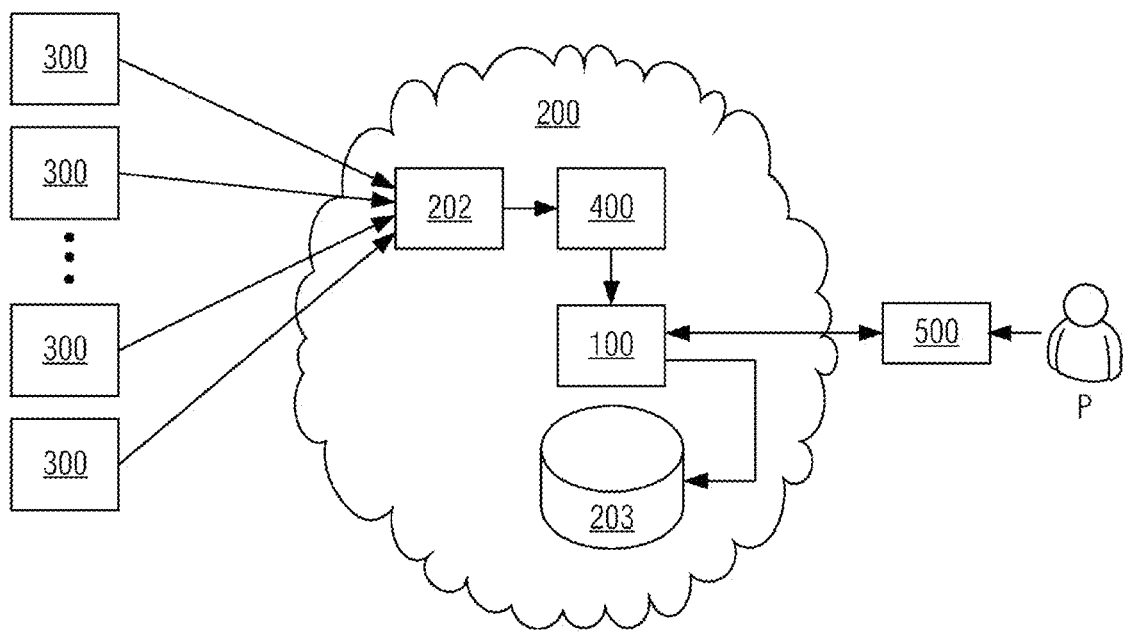
FIG. 8 is a schematic diagram of the system for identifying the address of device parameters of an industrial device according to the first illustrative embodiment of the present invention.

FIG. 8 shows the system for identifying the address of device parameters of an industrial device according to the embodiments of the present invention. The differences of the embodiment shown in FIG. 8 from the embodiment shown in FIG. 7 are that the controller 400 is deployed on the cloud platform and remotely controls industrial devices over a communication connection (for example, the Internet). In this case, the controller 400 exists in the form of software service on the cloud platform.

In this case, the cloud platform collects data from the sensors of industrial devices through the collector 202. Here, the collected data is sent to and stored in the controller 400. When the operator invokes the address identification apparatus 100 through the input/output device 500, the address identification apparatus 100 directly acquires the data array about industrial devices from the controller 400 and executes the method shown in FIGS. 1 to 4. In this case, the data array comprises the collected actual status values and the address where the actual status values are stored in the controller.

Although the internal controller of industrial devices is not shown in FIG. 8, the internal controller of industrial devices and the controller of the cloud platform simultaneously exist and are applied to different industrial devices in one illustrative embodiment of the present invention. In this case, the address identification apparatus 100 according to the present invention acquires data from the internal controller of industrial devices or the controller of the cloud platform, as required.

In one illustrative embodiment of the present invention, the cloud platform further comprises a database 203 for storing the established mapping between device parameters and the storage address. After the above-mentioned mapping is established, the address identification apparatus 100 transmits the mapping to the database of the cloud platform for recording so that it can be used in future.

According to a further embodiment of the present application, a storage medium is provided and the storage medium contains a stored program, wherein the program controls the execution of the method according to an embodiment of the present invention by the device where the storage medium is located when the program is run.

According to a fourth embodiment of the present application, a processor is provided and the processor is used to run a program, wherein the program executes the method according to an embodiment of the present invention when the program is run.

According to a fifth embodiment of the present application, a terminal is provided and the terminal comprises one or more processors, a memory and one or more programs, wherein one or more programs are stored in the memory and are configured to be executed by one or more processors, and one or more programs execute the method according to an embodiment of the present invention.

According to a sixth embodiment, a computer program product is further provided, the computer program product is tangibly stored in a computer-readable medium and comprises computer-executable instructions, and when the computer-executable instructions are executed, at least one processor executes the method according to an embodiment of the present invention.

The method according to embodiments of the present invention can be realized by a program on the storage medium, the processor and the terminal, and thus the association between device parameters of industrial devices and the storage address in the controller controlling the industrial devices can be determined. Among the above-described embodiments of the present invention, each embodiment has its own focal points. For the parts not described in an embodiment, please refer to the related description of other embodiments.

According to an embodiment of the present invention, an automatic association between device parameters of industrial devices and the storage address in the controller controlling industrial devices is realized. With the aid of the reproducible method, the accuracy of the association is improved, and thus labor and time are saved.

It should be understood that the technical content disclosed in the embodiments of the present invention can be realized in other ways. The above-described embodiments of the apparatus are given only for the example purpose. The division of units or modules is only a logical function division, and other division methods may be used in the actual realization. For example, a plurality of units or modules or components may be combined or integrated into another system, or some features may be ignored or may not be executed. In addition, the shown or discussed couplings, or direct couplings or communication connections between them may be indirect couplings or communication connections, electrical or otherwise, through some interfaces, modules or units.

The unit or module described as a separate part may be or may not be physically separated, and the part shown as a unit or module may be or may not be a physical unit or module, that is to say, it may be located at one place or may be distributed to a plurality of network units or modules. Part or all of the units or modules may be selected to realize the solutions of the embodiments according to the actual requirement.

In addition, the functional units or modules in each embodiment of the present invention may be integrated into a processing unit or module, or each unit or module may physically exist separately, or two or more units or modules may be integrated into a unit or module. The above-mentioned integrated unit or module may be realized in the form of hardware or in the form of a software functional unit or module.

The integrated unit may be stored in a computer-readable storage medium if it is realized in the form of a software functional unit and is marketed or used as an independent product. Based on such an understanding, the technical solution of the present invention or the part which makes contributions to the prior art, or all or part of the technical solution may essentially be represented in the form of a software product, and the computer software product is stored in a storage medium and comprises a plurality of instructions to enable a computer (PC, server or network equipment) to execute all or part of the steps of the method described in the embodiments of the present invention. The above-mentioned storage medium includes USB disk, read-only memory (ROM), random access memory (RAM), mobile hard disk, magnetic disk or optical disk and other various media which can store program codes.

Only preferred embodiments of the present invention are described above. It should be pointed out that those skilled in the art can make improvements and modifications without departing from the principle of the present invention and these improvements and modifications should also fall within the scope of protection of the present invention.

The invention claimed is:

1. A method for identifying an address of at least one device parameter of an industrial device, the method comprising:
    defining a screening library, the screening library including at least one expected attribute value, the at least one expected attribute value describing an expected status value of the at least one device parameter to be addressed in at least one operating mode of the industrial device;
    acquiring a data array, the data array including an actual status value generated in the at least one operating mode of the industrial device and a corresponding address of a location of storage of the actual status value in at least one electronic circuit controlling the industrial device;
    extracting, for a respective address of a plurality of addresses, a respective actual attribute value of an actual status value correspondingly stored in the respective address;
    comparing the respective actual attribute value with the at least one expected attribute value, determining the corresponding actual status value of the respective actual attribute value complying with the at least one expected attribute value, and determining a corresponding address of the corresponding actual status value, of the respective actual attribute value complying with the at least one expected attribute value, selected from the data array; and
    outputting the corresponding address, of the corresponding actual status value selected from the data array, as a final address.

2. The method of claim 1, wherein after the comparing and before the outputting, the method further comprises:
    determining, upon selecting a plurality of corresponding addresses for a plurality of corresponding actual status values, whether a number of the plurality of corresponding addresses, of the plurality of corresponding actual status values selected, complies with an expected number set at a time of defining the screening library, and
    upon the determining indicating that the number of the plurality of corresponding addresses does not comply, iteratively performing the defining, the acquiring, the extracting and the comparing again to permit redefining of the screening library and reacquiring of the data array for each iteration performed.

3. The method of claim 1, wherein the at least one expected attribute value is selected from an array of a plurality of attribute values.

4. The method of claim 1, wherein the at least one expected attribute value is a manually input parameter.

5. The method of claim 1, wherein the at least one expected attribute value includes a plurality of attribute expected values, wherein the data array is a time sequence data array, wherein the corresponding actual status values stored in each respective corresponding address form a time sequence array, and wherein for the time sequence array, the plurality of expected attribute values describe a change curve of the time sequence array over time.

6. The method of claim 1, wherein a mapping is established between the final address and the at least one device parameter to be addressed and wherein the mapping established is transmitted to a database for later invocation of the mapping.

7. The method of claim 2, wherein the at least one expected attribute value is selected from an array of a plurality of attribute values.

8. The method of claim 2, wherein the at least one expected attribute value is a manually input parameter.

9. The method of claim 2, wherein the at least one expected attribute value includes a plurality of expected attribute values, wherein the data array is a time sequence data array, wherein the corresponding actual status values stored in each respective corresponding address form a time sequence array, and wherein for the time sequence array, the plurality of expected attribute values describe a change curve of the time sequence array over time.

10. An apparatus for identifying an address of at least one device parameter of an industrial device, the apparatus comprising:
    at least one electronic circuit configured to
        define a screening library, the screening library including at least one expected attribute value, the at least one expected attribute value describing an expected status value of the at least one device parameter to be addressed in at least one operating mode of the industrial device,
        acquire a data array, the data array including an actual status value generated in the at least one operating mode of the industrial device and a corresponding address of a location of storage of the actual status value is stored in the at least one electronic circuit configured to control the industrial device,
        extract, for a respective address of a plurality of addresses, a respective actual attribute value of an actual status value correspondingly stored in the respective address,
        compare the respective actual attribute value with the at least one expected attribute value, determine the corresponding actual status value of the respective actual attribute value complying with the at least one expected attribute value, and determine a corresponding address of the corresponding actual status value, of the respective actual attribute value complying with the at least one expected attribute value, selected from the data array, and output a corresponding address, of the corresponding actual status value selected from the data array, as a final address.

11. The apparatus of claim 10, wherein the at least one electronic circuit is further configured to determine, upon selection of a plurality of corresponding addresses for a plurality of corresponding actual status values, whether a number of the corresponding addresses, of the plurality of corresponding actual status values selected, complies with an expected number set at a time of defining the screening library, and reset the screening library defined and the data array acquired upon determining that the number of the plurality of corresponding addresses does not comply, to permit redefining of the screening library and reacquiring of the data array.

12. The apparatus of claim 10, wherein the at least one electronic circuit is further configured to receive the data array.

13. The apparatus of claim 10, wherein the at least one electronic circuit is further configured to establish a mapping between the final address determined and the at least one device parameter to be addressed and is further configured to transmit the mapping established to a database for later invocation of the mapping.

14. The apparatus of claim 10, further comprising:
a display, configured to display the final address.

15. The apparatus of claim 10, wherein the at least one electronic circuit includes a programmable logic controller (PLC).

16. The apparatus of claim 10, wherein the at least one electronic circuit includes at least one processor.

17. The apparatus of claim 11, wherein the at least one electronic circuit is further configured to receive the data array.

18. The apparatus of claim 11, wherein the at least one electronic circuit is further configured to establish a mapping between the final address determined and the at least one device parameter to be addressed and is further configured to transmit the mapping established to a database for later invocation of the mapping.

19. The apparatus of claim 11, further comprising:
a display, configured to display the final address.

20. A processor, configured to execute a program, wherein upon the program being executed by the processor, the processor is configured to perform identifying of an address of at least one device parameter of an industrial device, comprising:

defining a screening library, the screening library including at least one expected attribute value, the at least one expected attribute value describing an expected status value of the at least one device parameter to be addressed in at least one operating mode of the industrial device;

acquiring a data array, the data array including an actual status value generated in the at least one operating mode of the industrial device and a corresponding address of a location of storage of the actual status value in a at least one electronic circuit controlling the industrial device;

extracting, for each respective address of a plurality of addresses, a respective actual attribute value of an actual status value correspondingly stored in the respective address;

comparing the respective actual attribute value with the at least one expected attribute value, determining the corresponding actual status value of the respective actual attribute value complying with the at least one expected attribute value, and determining a corresponding address of the corresponding actual status value, of the respective actual attribute value complying with the at least one expected attribute value, selected from the data array; and outputting the corresponding address, of the corresponding actual status values selected from the data array, as a final address.

\* \* \* \* \*